Patented Oct. 22, 1946

2,409,630

UNITED STATES PATENT OFFICE 2,409,630

METHOD OF MAKING A COATED VEGE- TABLE-FIBER BOARD

Clark C. Heritage and Henry E. Walter, Cloquet, Minn., assignors to Wood Conversion Company, Cloquet, Minn., a corporation of Delaware No Drawing. Application September 9, 1939, Serial No. 294,215

4 Claims. (Cl. 92—40)

The present invention relates generally to coating compositions and to the use thereof. In particular it relates to the manufacture of artificial board with a coating thereon. It also relates particularly to such a coating applied during the manufacture of the board.

Heretofore, considerable difficulty has been encountered in attempts to produce white coats on inherently rough surfaced fiber boards, of vegetable fiber, of natural mineral fiber, or of synthetic mineral fiber. To secure the desired white effect it is necessary to cover entirely all of the exposed surface fibers. This may be done by loading the surface to fill all the interstices and cover all the fibers. However, this is wasteful of coating material, and in addition it hides the texture of the uncoated board, which texture is often desired, not in the natural fiber color, but in a white color.

Heretofore, formed fiber boards, that is, dry boards after formation, have been treated with coating compositions in attempts to give a white surface. There are disadvantages in such practice. The composition either soaks in, or if it does not, it does not take well, and fibers are not wholly covered. A fractional area of exposed fiber readily offsets the "whiteness" of a coating material per se, as viewed from a distance with the naked eye. Also, on drying liquid coating compositions applied to dry board, the board may be pulled into a warp by stresses produced in the coat, if there is no restraint in drying. Particularly, boards which are made to be water-resistant when dry, do not take well any aqueous composition applied to surface unless it is copiously applied. A copious application increases the warping tendency.

The present invention provides a composition which may be applied to boards while they are wet in process of manufacture, which takes well in both light and heavy usages to assure covering all the exposed fibers, and which may be used in small quantity to leave the texture and coat the fibers, or in higher quantity to coat the fibers and partially fill the interstices, thus exhibiting texture, or in still higher quantity which may hide the fibers and the interstices to form a smooth coat, practically hiding texture.

It is an object of the invention to provide a white surfaced coated board with complete whiteness due to covering of fiber, and with varying effects in appearance of texture due to variations in usage.

It is also an object of the invention to provide an inexpensive coating composition for wall board, in process of manufacture, or after manufacture, which maintains its whiteness and its covering power for fibers.

It is a particular object of the invention to provide an aqueous coating composition so that it may be used compatibly with wet stock in the manufacture of board.

It is also an object to use a coating composition which will withstand a high temperature such as to permit it to be dried simultaneously with a wet sheet carrying it in forming a board.

It is also an object to provide a coating composition and a coated board which is washable with soap and water; which is resistant to scuff; which has a low oil absorption, so that it may be later painted with an oil paint without necessity for priming; which may exhibit a continuous coat; which will not cause warping; which will not spot with water; which resists absorption of water and may be later painted with a water paint; which resists infiltration of air; which is cleanable with wallpaper cleaners; which lacks odor; which has a high total light reflectance; and in short, which is highly desirable and advantageous to provide and maintain white walls or ceilings in a home, office, hall or like quarters.

Various other and ancillary objects and advantages of the invention will become apparent from the following description and explanation.

The boards for which the coating composition are most desirable are the so-called insulating wall boards. For their practical uses, such boards are required to be water-proofed or water-resistant. This is commonly done in process of manufacture by using an emulsion of a water-proofing compound such as a fat, oil, wax or metallic soap or like substance, which will effect the result to some degree. Where wax is used as an emulsion, the emulsion is precipitated, as with alum, and the precipitated particles on the fibers do not attain their ultimate function until the board is dry. Thus, a so-treated board when dry is resistant to an aqueous coating composition. Yet the same board in process, while moist and before drying, is not resistant to such a composition. This is a very important distinction where low usage of coating material is desired. Under such conditions of low usage, the board surface (viewed microscopically) presents a brush-heap appearance, with individual fibers raised high from the body, and with deep recesses defined by other matted fibers of the brush-heap appearance. A thin coat of material must adhere to the entire surface of the fibers. Dry water-resistant fibers tend to repel the composition leaving uncoated portions of fibers, and forcing the composition to span the inter-fiber spaces. No perfect continuous color results, because of the uncoated fibers showing through. Such a board is not stable in color because there are photo-chemical and atmospheric changes of color in the exposed fibers. To avoid uncoated spots on fibers, high usage is required, which also has a filling action on the pores or interstices.

Accordingly, it is most important to provide a coating composition which is susceptible to use for entirely covering all the exposed fiber at very low usage.

The composition in general requires a pigment which remains white, and a binder or base for dispersing it in an aqueous medium, which binder will give a desirable coating when properly treated. A protein base which is dispersible in water is used, yet which is not reversibly dispersed from the ultimate coating, on wetting with water. Many types of protein offer this property, such as casein, soy-bean protein, corn protein and other vegetable proteins. Proteins such as glue and gelatine as normally used are useful even though they are reversible with water, and are preferably used with chromates, alum, formaldehyde or other hardening agents which render them less dispersible after drying. In practice, it is preferred to use a protein which may be dispersed and adjusted to remain in dispersion, yet when properly dried, is not easily reversible as regards dispersion in slightly alkaline water, such as soap solutions. Such a protein is of vegetable origin, as for example corn protein and soy-bean protein, as will appear below.

The pigment is one such that it is dispersible in the protein, which remains white, and which has high hiding power. The permanent white pigments titanium dioxide and lithopone, are good examples. Also the commercial titanated lithopones may be used, these being lithopone incorporating titanium oxide in several ways. Lithopone is preferred largely on account of price.

These pigments are commonly incorporated into oil-base and other non-aqueous coating compositions, where the base in the ultimate coat is permanent and in considerable proportion to the pigment. However, in the present invention the vehicle is water and the binder is in relatively small proportion to the amount of pigment. As the vehicle is lost, the binder and pigment form into the ultimate coat. To have this formed with a high degree of uniformity it is preferred to have present an additional agent which effects this result. Diatomaceous earth is the only agent which has been found to have the property. In itself, it has no appreciable hiding power in the protein base, but when the pigment is present it greatly increases the hiding power of the composition, giving uniformity in appearance. Thus, where very low usages are desired, it is very important that diatomaceous earth be present. As usage increases to heavier coats the necessity is less, but it is nevertheless still very desirable.

The following is the preferred example of the composition, used in the order listed:

| | Parts by weight |
|---|---|
| Hot water, 170° F | 2,500 |
| Borax | 51 |
| Protein (soy-bean) | 300 |
| As one solution: | |
| Boric acid | 30 |
| Glycerine | 30 |
| Water | 300 |
| Red oxide of iron | 0.5 |
| Yellow oxide of iron | 2.0 |
| Diatomaceous earth | 240 |
| Lithopone | 2,850 |

Thus, the principal elements are in the relation as follows.

| | Per cent |
|---|---|
| Lithopone | 82 |
| Protein | 8.65 |
| Diatomaceous earth | 6.9 |
| Other solids | 2.45 |

The iron oxides are merely toners to dispense with the glaring whiteness of the pigment. The remaining elements are pertinent to the use of the protein. It is well known that proteins are dispersible by use of alkalis. Mild alkali is preferred, and for that function borax is suitable. The borax is dissolved in 2500 parts of water, and then the protein dispersed in this hot solution. This makes an alkaline dispersion, which is not desired, as when dry, it tends to make the protein reversibly dispersed when wet. So the solution is brought away from the alkaline side to a pH of 7 or below without precipitating the protein. This is done with the solution of boric acid and glycerine, giving a pH of 6.3 to 6.7. The glycerine acts as a buffer and helps to keep the protein from precipitating. Then the pigments are added and the composition is ready for use. It has been compounded for a workable viscosity as will later be described, for the purposes of application.

This composition has high adherence and uniform spreading power over wet fibers, with or without a latent water-proofing compound, such as paraffin precipitated from emulsion in the fiber slurry which forms the board. In high usage, it also has adherent power to dried fibers with or without the water-proofing treatment. But in low usage it does not adhere uniformly to the dried water-proofed board.

By applying the composition to moist or wet board before the first drying, light to heavy usage may be employed with variable results as desired. By drying the coating and the board together, the tensions resulting are such that the coating, even though it is thick does not pull the board into a warp.

The coating may be applied by brushing, spraying, by roll transfer, roll and pool, or doctor blade, according to results desired. The viscosity of the coating is pertinent to the method of application, and it may be controlled by varying the water content, or the protein content, or both, or even the kind of protein. For example, a composition which is suitable for application by a pool behind a roll, is suitable for spray coating, but every composition suitable for spray-coating is not suitable for the roll and pool method.

The effect of viscosity is exemplified by reference to the use of a pool behind a roll. In such use the moist mat approaches downwardly the nip of two rolls and passes through with the formation of a pool on the moist mat and behind the top roll. The moisture in the mat and fibers assures that the fibers are wettable by the composition, and the pool covering assures perfect contact.

The pressure of the upper roll is controllable in the degree with which it compresses the mat. Thus, it effects a forcing of the composition well into the surface, controls the amount which is squeezed back into the pool, and hence controls the amount left on the mat. The fibers at the top spring back and carry with them a perfect coat of the pigment. Where a light coat is used, the fibers rather than the interstices select the composition. Where heavy coats are used the interstices are comparably filled. This all refers to the aqueous composition which is about 45% water.

In drying, the mass and the fibers shrink in sufficiently close degree to maintain a complete coat on the fibers, and to fill the interstices as the quantity permits. In practice, the coated mat is dried at 310° F. Thus, moisture is practically boiled out of the board. In light usages the interstices being not sealed permit the escape of vapor. Where the composition is present to such extent as to seal the pores, microscopic craters may be found where the steam blows out. However, these do not alter the continuous white appearance of the surface. The drying at this high temperature greatly benefits the surface for practical uses.

Pigment and diatomaceous earth

Referring to the above formula, the diatomaceous earth has been omitted and the lithopone has been substituted by 2400 parts of a commercial titanated lithopone having regard to the equivalency in hiding power of 25 parts of titanium dioxide and 150 parts of lithopone. Also, 2240 parts of such titanated lithopone and 224 parts of diatomaceous earth have been used. The results are substantially the same, but with the diatomaceous earth, low usages show more uniformity. Without it, there is a somewhat mottled appearance.

In the above formula, the diatomaceous earth may be varied from about 6% to 20% of the weight of lithopone, and in practice may vary from about 8.5% to 12% without noticeable change in the details of applying it. Above 20% the composition tends to be picked up from the surface of the board by an applying steel roll. Below about 6% the lack of uniformity in low usage becomes apparent.

Usage

In roll and pool application, the water in the board, the bond of fiber to fiber at the surface of the board, the pressure of the roll, and the viscosity of the composition are important controls to determine usage. If the viscosity is too low, the vehicle strikes into the board and poor coverage results. If it is too viscous it sticks to the roll and picks up from the board. In practice a viscosity of 20 seconds on No. 3A Ford cup at 120° F. is suitable, and this may vary from 17 to 24 seconds without necessitating changes in operations for a fixed roll pressure.

Drying

Varying the rate of drying has no appreciable effects. However, the properties of the coating are affected by the manner in which it is dried. These are illustrated by reference to a board coated with an average usage of from 60 to 66 pounds of the given formula composition per 1000 square feet of surface, for a commercial product.

Commercial product

A wet mat made from wood fiber containing wax precipitated from emulsion is roughened to produce an irregular surface with hills and valleys. This is run under a screen wire in pressing, producing a moist mat with hills and valleys and visible wire markings. This wire-mark illustrates an embossed effect. The marked mat is coated from a pool with a roll at a usage of 60 to 66 pounds per 1000 sq. ft. and dried at 310° to 345° F. in a drier which has platens or feet pressing intermittently on the surface as the mat dries. It is an important characteristic of the composition that it does not adhere to said platens or feet, nor is it altered by said platens or feet.

The dried product at this usage has a continuous coat of the pigment which hides all the exposed fiber, yet which does not conceal the form of a fiber as viewed under the microscope. The interstices are sealed, but not filled. The wire markings are partly filled but not hidden at close inspection, but not evidenced at distant inspection. The uneven texture of hills and valleys is preserved and is visible at distant inspection.

This coated mat has been dried for varying periods of 1 hour, 1½ hours and 2 hours, at each of the temperatures: 150° F., 200° F. and 250° F., to study the effects of drying on the important characteristics of the board. The results are expressed hereinafter as follows:

Penetration by water is not related to drying time, is less when coated on dry board, and greater when coated on wet board.

Penetration by oil is important when considering the coated board as a base for an oil paint. This is less when the wet board is coated by a spraying process, than where the dry board is spray coated. It is less when the wet board is roll coated than when the wet board is spray coated.

The bond of the coat to the board is expressed in grams per square centimeter at the point of rupture:

Spray coated, dry _____ 464
Spray coated, wet _____ 594
Roll coated, wet _____ 510

The appearance of a spray coat (wet or dry) tends to be glossier, smoother to the touch, and less fibrous in texture. An air-dry coat is more chalky and rubs off with washing with a moist cloth. However, the washability increases with time and temperature of baking.

The scuffability is about the same irrespective of whether a wet or dry board is roll coated or spray coated. The coat is less scuffable with increased baking temperature of a dry-coated board. (Comparison on wet-coated not made.)

Usage modifications

As the usage becomes heavier, the coat becomes smoother, the fibers more heavily coated, the pores more filled, the surface harder and less scratchable, the scuffability decreases, the surface is more washable, the oil-resistance increased, and the flame-resistance increased, while the bond and water-resistance are not changed.

As the solids in the composition are decreased, the bond improves. This was accomplished by diluting the composition with water, having the effect of lessening viscosity and securing deeper penetration into the board.

Resistance to washing

Resistance to washing is a most important property for use of the coated board as interior wall decoration. Washability is better by applying the composition to wet board than to dry board. It is better by spraying wet board than by spraying dry board, and likewise the resistance to scuffing.

It is a practice in making boards to add binder, filler or sizing material to the stock so as to leave the same in the finished board, for example, a colloidal starch. This may be done with the stock of which the mat is to be coated, without in any way interfering with the invention as described. Also, where such filler is or is not present, the surface of the wet mat may be sized with the same effect by wetting the formed board with a thickened sizing solution, such as gelatine or other protein, or starch or the like. This penetrates into the surface for a limited distance, so that on drying the board, the so-treated surface is harder and more resistant to scuff. Such size more readily enters the board than the coating composition with its load of pigment. By using such size preliminarily to using the composition, more of the binder of the composition remains in the pigment coat. Thus, where a more expensive binder is employed, its quantity may be reduced. A starch solution (thick-boiled as in laundering) may be used as an undercoat, filling the pores and sizing the fibers, and while the board is still wet with such starch solution, the pigmented aqueous composition may be applied, as if no sizing were present.

In the specification and accompanying claims where reference is made to binding the particles of pigment to the fiber, it is to be understood that the fiber may be sized before or after the mat is formed, as described, or not at all.

From the foregoing it will be understood how the invention may be varied within the scope of the appended claims.

We claim:

1. The method of making a coated, rigid, porous, structural vegetable-fiber board which comprises forming a water slurry of wet vegetable fibers, forming said slurry into a wet-structural-board-forming mat, which, when dried, yields a rigid, porous, structural board, coating said wet mat with a fluid aqueous coating composition having therein pigment including a major portion of white pigment selected from the group consisting of lithopone and titanated lithopone, said composition being applied in quantity to provide pigment to hide the surface fibers in the final dried board, said composition having a minor portion of diatomaceous earth in quantity from 6% to 20% by weight of the quantity of said white pigment, and said aqueous composition having an aqueous vehicle of water with protein dispersed therein to serve as binder for binding the pigment to the fiber of the mat and also to itself, and simultaneously drying the mat and the coat thereon to form a board with uniformly pigmented surface.

2. The method of making a coated, rigid, porous, structural vegetable-fiber board which comprises forming a water slurry of wet vegetable fibers, forming said slurry into a wet-structural-board-forming mat, which, when dried, yields a rigid, porous, structural board, coating said wet mat with a fluid aqueous coating composition having therein pigment including a major portion of white pigment selected from the group consisting of lithopone and titanated lithopone, said composition being applied in quantity to provide pigment to hide the surface fibers in the final dried board, said composition having a minor portion of diatomaceous earth in quantity from 6% to 20% by weight of the quantity of said white pigment, and said aqueous composition having an aqueous vehicle of water at a pH not over 7 with soy bean protein dispersed therein to serve as binder for binding the pigment to the fiber of the mat and also to itself, and simultaneously drying the mat and the coat thereon to form a board with uniformly pigmented surface, while exposing the board to a drying medium having a temperature above 212° F. for hardening the soy bean protein residue in said coat for resisting redispersion when the dried coat is wet with water.

3. The method of making a coated, rigid, porous, structural vegetable-fiber board which comprises forming a water slurry of wet vegetable fibers carrying a water-proofing agent deposited thereon, forming and pressing said slurry into a wet structural-board-yielding mat, coating said wet mat with a fluid aqueous coating composition having therein pigment including a major portion of white pigment selected from the group consisting of lithopone and titanated lithopone, said composition being applied in quantity to provide pigment to hide the surface fibers in the final dried board, said composition having a minor portion of diatomaceous earth in quantity from 6% to 20% by weight of the quantity of said white pigment, and said aqueous composition having an aqueous vehicle of water with protein dispersed therein to serve as binder for binding the pigment to the fiber of the mat and also to itself, and simultaneously drying the mat and the coat thereon to form a board with uniformly pigmented surface.

4. The method of making a coated, rigid, porous, structural vegetable-fiber board which comprises forming a water slurry of wet vegetable fibers carrying a water-proofing agent deposited thereon, forming and pressing said slurry into a wet structural-board-yielding mat, coating said wet mat with a fluid aqueous coating composition having therein pigment including a major portion of white pigment selected from the group consisting of lithopone and titanated lithopone, said composition being applied in quantity to provide pigment to hide the surface fibers in the final dried board, said composition having a minor portion of diatomaceous earth in quantity from 6% to 20% by weight of the quantity of said white pigment, and said aqueous composition having an aqueous vehicle of water at a pH not over 7 with soy bean protein dispersed therein to serve as binder for binding the pigment to the fiber of the mat and also to itself, and simultaneously drying the mat and the coat thereon to form a board with uniformly pigmented surface, while exposing the board to a drying medium having a temperature above 212° F. for hardening the soy bean protein residue in said coat for resisting redispersion when the dried coat is wet with water.

CLARK C. HERITAGE.
HENRY E. WALTER.